United States Patent
Castelblanco et al.

(10) Patent No.: US 9,784,348 B2
(45) Date of Patent: Oct. 10, 2017

(54) TAILGATE AND DOOR ADJUSTORS

(71) Applicants: Guillermo Castelblanco, Valencia, CA (US); Carl Steven Castelblanco, Huntington Beach, CA (US)

(72) Inventors: Guillermo Castelblanco, Valencia, CA (US); Carl Steven Castelblanco, Huntington Beach, CA (US)

( * ) Notice: Subject to any disclaimer, the term of this patent is extended or adjusted under 35 U.S.C. 154(b) by 0 days.

(21) Appl. No.: 15/018,618

(22) Filed: Feb. 8, 2016

(65) Prior Publication Data

US 2017/0045124 A1    Feb. 16, 2017

Related U.S. Application Data

(60) Provisional application No. 62/204,668, filed on Aug. 13, 2015.

(51) Int. Cl.
| | |
|---|---|
| *F16H 21/06* | (2006.01) |
| *F16H 21/44* | (2006.01) |
| *E05F 5/06* | (2006.01) |
| *B62D 33/027* | (2006.01) |
| *B60P 1/26* | (2006.01) |

(52) U.S. Cl.
CPC ............... *F16H 21/06* (2013.01); *B60P 1/26* (2013.01); *E05F 5/06* (2013.01); *F16H 21/44* (2013.01); *E05Y 2201/218* (2013.01); *E05Y 2900/546* (2013.01)

(58) Field of Classification Search
CPC ..... F16H 21/06; F16H 21/44; B62D 33/0273; E05F 5/06; E05Y 2900/546; E05Y 2201/218
USPC ........................................................ 296/50
See application file for complete search history.

(56) References Cited

U.S. PATENT DOCUMENTS

| | | |
|---|---|---|
| 2,561,081 A | 7/1951 | Vars |
| 5,630,637 A | 5/1997 | Sauri |
| 6,206,444 B1 | 3/2001 | Casey |
| 6,267,429 B1 | 7/2001 | Kuzmich et al. |

(Continued)

OTHER PUBLICATIONS

International Search Report and Written Opinion application No. PCT/US2016/042045. Mailed Jan. 9, 2017.

*Primary Examiner* — Joseph D Pape
*Assistant Examiner* — Dana Ivey
(74) *Attorney, Agent, or Firm* — Carlos A. Fisher

(57) ABSTRACT

A tailgate adjuster in a preferred example comprises an adjustably locking rotatable bracket comprising a plurality of rotatably linked shank components, with at least one shank component joined to a sprocket component having a plurality of sprocket teeth, and at least one other shank component joined to a rotatable trigger component having a sprocket-engaging trigger tooth. The trigger component is preferably spring biased to maintain the trigger tooth in an engaged position with the sprocket teeth, and can be adjusted to disengage the trigger component from the sprocket teeth. The sprocket teeth are spaced to permit the locking of shank components at a desired angle to each other. Holes at each end of the tailgate adjuster permit the rotatable mounting of one such end to a vehicle tailgate or hatchback and the other end to a fixed location of the vehicle. In other examples the invention concerns a tailgate-reinforcing sheath and methods for maintaining a vehicle tailgate or other hinged door, gate or window in a one of a plurality of partly open positions.

12 Claims, 5 Drawing Sheets

(56) References Cited

U.S. PATENT DOCUMENTS

| | | |
|---|---|---|
| 6,418,667 B1 | 7/2002 | Moon |
| 6,857,678 B2 | 2/2005 | Lisk, III |
| 7,303,218 B2 * | 12/2007 | Kraenzle .............. B62D 33/037 |
| | | 292/304 |
| 8,070,207 B2 | 12/2011 | Zielinsky |
| 8,070,208 B2 | 12/2011 | Zielinsky |
| 8,075,038 B2 | 12/2011 | Zielinsky |
| 8,087,710 B2 | 1/2012 | Zielinsky |
| 2002/0135202 A1 | 9/2002 | Rokahr |
| 2011/0089712 A1 | 4/2011 | McIntyre et al. |
| 2014/0028046 A1 | 1/2014 | Cauley et al. |

* cited by examiner

TAILGATE AND DOOR ADJUSTORS

RELATED APPLICATIONS

This application claims priority under 35 U.S.C. §119(e) to U.S. Provisional Patent Application Ser. No. 62/204,668, filed Aug. 13, 2015.

FIELD OF THE INVENTION

The present invention relates to adjustors for maintaining a tailgate, automobile hatchback or door in a desired position fixed in at least one direction, i.e., opposing a force having a vector in a substantially constant direction. Thus, the invention relates to the automotive and trucking industries, the building and moving industries and other fields in which maintaining a structure rotatable about an axis in a fixed position against at least one directional force vector (such as gravity and/or wind) is desired.

BACKGROUND OF THE INVENTION

A common feature of most trucks, such as pickup trucks, and some cars is a tailgate. The term "tailgate" generally refers to a door or gate comprising a hinged gate at the back of the cargo bed of a truck or car (such as a station wagon) that can be lowered or otherwise moved to facilitate loading or unloading the vehicle. Generally, a tailgate has two fixed positions: it may be locked and fastened e.g., to the side panels of the truck bed, or may be unlocked and permitted to freely move about the axis defined by a hinge—this may be, for example, generally in an "up and down" direction or less commonly from side to side.

Originally, tailgates, such as pickup truck tailgates, were designed without support in the "open" position; this when opened, the tailgate was simply permitted to fall down to an angle of about 180° to its closed position (unless hindered by the bumper or other vehicle features). Most modern trucks, station wagons, and the like are built to support the tailgate when it is the "open" position, in which the gate is generally horizontal and substantially parallel to the axis of the front-to-back aspect of the car and at about a 90° angle to its closed position. Support is generally provided by one or more cable or by one or more pneumatic cylinder. These support means may have one end anchored to the truck (for example, to the side panel(s) of the truck) and the other end may be mounted on the back or side of the tailgate itself.

Similarly, some vehicles, such as some trucks, hatchback cars and station wagons, have rear gates, windows, or doors that open by being raised rather than lowered. Some of the gates, windows or doors have springs and/or pneumatic cylinders that automatically cause the door to raise to the fullest extend when they are opened.

In one illustration, occasionally the bed or cargo area of a vehicle may be used to transport an item (such as e.g., a motorcycle, lumber, surfboards) that is larger than, or extends beyond the rear tailgate or window thereof. In such cases it is difficult to assure that the cargo remains firmly secured within the bed when the vehicle is in motion. It is therefore common practice in such situations to use twine, rope or cords to maintain the gate, door, or window in a partially closed position, and/or to otherwise to tie the cargo down within the bed or cargo area. This practice can be inconvenient, time consuming and potentially dangerous.

Tailgates that are supported only in a horizontal position, or which are supported only by cables, make the loading and unloading of cargo, particularly wheeled cargo such as motorcycles, ATV's tractors and the like more difficult, as the tailgate cannot be used as a ramp. It would be helpful in some instances to securely support the tailgate at an angle greater than about 90° to its closed position so as to permit the tailgate to be used as a ramp.

Furthermore, many owners put a load on their tailgate without knowing the integrity of the installed cables or pneumatic cylinders.

Zelinsky (U.S. Pat. Nos. 8,075,038, 8,070,207, 8,070,208 and 8,087,710) discloses systems for installation on pickup trucks employing a cable element, in certain cases having a rigid portion comprising an adjustor or lever to lengthen or shorten the cable between 2 positions, or wherein the cable has a long and a short end than can be hooked to the tailgate or truck body, or where the cable fits into a slider built into the tailgate to permit the tailgate to rest in more than two positions, or have a cable section and a rigid section to hook the cable onto. In each case, the systems are somewhat complex to adjust, provide for adjustment of the tailgate between a limited set of positions, and/or require significant alternation of the tailgate and/or truck panels to function.

Cauley, U.S. Patent Publication 2014/0028046 discloses a tailgate system using two straps (one on each side of the tailgate) and provides for continuous adjustment of the length of the straps and thus the tailgate position. However, each strap must be adjusted and then matched to the length of the opposing strap in order to attain full support of the tailgate.

Kuzmich, U.S. Pat. No. 6,267,429 discloses a cable-based system in which a hinge provides first and second (primary and secondary) open positions.

These cable or strap systems may have the disadvantage of lacking rigidity resisting forces in the "upward" direction. That is, they may permit the tailgate to bounce up and down on a bumpy road, or of a quick braking was applied.

Lisk, U.S. Pat. No. 6,857,678, which uses a threaded rod and a roller to provide continuous adjustment of the tailgate height. This system may be time-consuming and difficult to use to balance the support of each side of the tailgate when in place.

Casey, U.S. Pat. No. 6,206,444 shows a tailgate spoiler apparatus which involves a rigid rod that can be extended or retracted into a pivoted housing constructed on the inside of the truck bed; this can be adjusting using a hydraulic cylinder or a motor to optimize the passage of air over the tailgate to create a spoiler effect. This system is complex and may take up valuable bed space.

Sauri, U.S. Pat. No. 5,630,637 discloses a somewhat complicated tailgate adjustment apparatus having shafts and a pair of chains traveling around sprockets. This invention would seem to require a major and expensive rebuilding of the truck bed.

Vars, U.S. Pat. No. 2,561,081 discloses the use of two rigid metal straps that a permanently affixed to the truck. Each is hinged to a swivel the side panel of the truck. These straps have keyhole apertures placed along their length to engage studs fixed at the outer edges of the tailgate; in this way the tailgate can be adjusted to a particular angle, and held in place using the corresponding keyhole apertures.

Thus, there is a need in the art for a simple and easily installed apparatus capable of rigidly holding a gate, door or window in a fixed position with respect to the direction of a force. There is also a need for a simple and easily installed apparatus for permitting the tailgate or be rigidly and adjustably supported in a variety of positions, which may include a position of greater than about 90° relative to the locked, closed position of the tailgate to facilitate the use of the tailgate as a ramp for the loading and unloading of cargo into the truck or car bed.

SUMMARY OF THE INVENTION

The present invention is directed to apparatus and methods for maintaining and supporting structures movable around at least one axis, such as hinged doors, gates and windows, rigidly in a desired and fixed position. In particularly useful examples, the apparatus and methods pertain to vehicle tailgates and hatchbacks (collectively "tailgates" unless indicated otherwise) that rotate around a substantially horizontal axis positioned proximate an edge (for example, a lower edge) of the tailgate. Furthermore, in some examples, the apparatus and methods of the present invention may be used to secure a window, such as a horizontally opening window of a camper shell, sports utility vehicle, or a recreational vehicle, in a partially open position.

In addition to helping secure a payload to the vehicle, and preventing it from falling or being ejected from the vehicle during transit, the apparatus and methods of the present invention may be used to provide a securely positionable, adjustable tailgate and/or window locking device to provide less drag and thereby increase gasoline, diesel and electrical mileage. As used herein, the word "payload" shall mean goods or other objects being transported or arranged for transport.

In other examples, the apparatus and method of the present invention may be useful for purposes other than, or in addition to, those related to motor vehicles, such as to provide a way to adjustably maintain a door wholly or partially open (for example, for ventilation purposes) in strong winds or another resisting force.

It therefore will be understood that as used in the present specification the term "tailgate adjustor(s)" shall refer to the apparatus of the invention without specific regard to where or how the apparatus is used, unless specifically indicated otherwise.

In certain examples, tailgate adjustors are provided which comprise a sprocketed support apparatus (e.g., a rotatable bracket) preferably comprised of a rigid metal, a metal alloy, a polymer, or a mixture of a polymer and a strengthener such as carbon fiber, and having a first end structured to be rotatably fixed to a vehicle panel located proximal to the rear gate or hatch opening of the vehicle, and a second end structured to be rotatably fixed to a tailgate, for example to a lateral side of a tailgate. The apparatus comprises a plurality of rigid approximately rectangular shanks (preferably, but not invariably, two shanks), pairs of shanks being joined and rotatable with respect to each other around a common axis thereby permitting the apparatus to be folded around the at least one common axis to shorten its reach, or unfolded around the at least one common axis to extend its reach. By "shank" is meant a generally rectangular rigid material (such as a stainless steel, a carbon fiber polymer, or a similarly strong material) having dimensions of length greater than their width, and dimensions of width greater than their thickness; shanks may have rounded ends. Preferably, the shanks are made from cold rolled steel or a similarly hard material. On one example, at least two shanks may be of unequal length and/or width to each other. Those of ordinary skill in the art will recognize that in certain embodiments of the invention three more shanks may be serially linked in a similar manner.

In a particular example two shanks may be used, with a first shank preferably being shorter than the second shank. The first shank may have exact or approximate dimensions of ¼×1×7¼ inches, while the second shank may have exact or approximate dimensions of ³⁄₁₆×1×9⅝ inches; those of ordinary skill in the art will be aware that these dimensions may be varied considerably depending upon the application, such as the dimensions of the vehicle, the dimensions and spacing of the attachment points for the shanks, the dimensions of the space between the window, door or gate and the side or frame panels, etc., without departing from the spirit or scope of the present invention.

The first end of the apparatus is located distally along the length of a first shank from the point of connection between the first shank and another shank; while the second end of the apparatus is located distally along the length of a second shank from the point of connection between the second shank and another shank. In a preferred example, the first and second shanks are rotatably connected to each other, for example, by a hinge, rod, bolt, screw, or rivet. In some examples, the first and second shanks are of equal length; in currently preferred examples the first and second shanks are of unequal length.

Preferably, the first end, the second end, or both ends of the apparatus are structured to be rotatably fixed to a vehicle panel and/or tailgate, respectively, by means of a hole or channel in the shank proximal to each said end. The hole or channel permits a shank to be rotatably fixed to the vehicle by bolting or screwing the shank, for example, by using a machine screw, to affix the shank to the truck side panel or tailgate, preferably using washers, such as a spacer washer and a shoulder washer. For tailgates, preferably, the existing cable systems may be removed from both the truck side panel and the tailgate, and the shanks of the present support apparatus joined thereto using the same tap holes (e.g., 10 mm×1.25 mm) as were used to join the cable system to these parts. For example, in certain cases a 10 mm×1.25 mm×30 mm machine screw may be used. The machine screws may be placed within polymer bushings having an opening slightly larger than the screw such that the screws can be tightened without inhibiting the ability of the support apparatus to swivel around them during use. It will be recognized that specialized systems may also be devised or used to facilitate the swiveling of the shanks when attached to the vehicle side panel and/or tailgate.

One of the shanks (preferably, but not necessarily, the long shank) has a sprocket firmly (i.e., non-rotatably) attached thereto, such as by gluing, screwing, bolting, riveting or welding. Preferably, the sprocket comprises a plurality of teeth, circumferentially or semi-circumferentially arranged around the sprocket body, biased and oriented towards the opposing end of the shank on which the sprocket is mounted; that is toward the second end of the apparatus if the sprocket is mounted on the shank joined to the tailgate, or toward the first end of the apparatus if the sprocket is mounted on the shank joined to the truck panel. The number of the sprocket teeth may be between about 6 and about 10 or more, such as about 8. The sprocket teeth may be spaced apart so as to orient the rotatably connected shanks in conveniently chosen increments with respect to each other; for example, in about 11.25 degree increments, or about 22.5 degree increments. It will be understood that for any given spacing of sprocket teeth, the addition of a greater number of teeth will permit the tailgate adjuster to be locked at an increased number of angles relative to the closed position of the tailgate.

The sprocket teeth are used to lock the tailgate adjuster in place (i.e., with the shanks locked at a specific angle) by a trigger component rotatably mounted on the shank that does not bear the sprocket, at a location proximal to the sprocket when the support apparatus is assembled and mounted. When the shanks are moved about the rotatable connection with respect to each other, the sprocket teeth are rotated with respect to the trigger component. The trigger has a hook-shaped sprocket-engaging tooth that is shaped and oriented to catch and securely hold a chosen sprocket tooth, thereby causing the shanks to be locked at a chosen angle with respect to each other in at least one dimension when the trigger is engaged. When the shanks are mounted on the tailgate and truck side panel, moving the tailgate up or down without the trigger component in an engaged position causes the shanks to rotate about the rotatable connection with respect to each other.

In preferred examples, the other shank (preferably the short shank) is rotatably joined to the sprocket-containing shank; the means of joining may be any suitable means, such as a rivet or a screw; preferably the shanks are joined by a rivet made of the same material as the shank. The sprocket (firmly joined to, and sufficiently braced against rotational movement due to torque forces on, the longer shank) may also be sandwiched between the shanks at this point. Preferably, the sprocket has a hole through which the rivet or machine screw joining the shanks can be inserted.

The trigger component may be biased in one position (e.g., the "closed" position), for example, with a spring. In preferred embodiments, a clip may be joined (e.g., screwed or bolted) to the shank carrying the trigger component; the trigger component may comprise an arm component for closing (e.g., engaging) and opening (e.g., disengaging) the trigger. The clip may be structured to capture and hold the arm of the trigger component (e.g., in an open position) with enough holding force to counteract the spring or other biasing means. The clip may comprise a flexible element, such as a channel, to engage and hold the trigger handle; this flexible element may, without limitation, comprise a rubber, a plastic such as PVC, or an elastomer. Alternatively, the clip and/or flexible element may comprise a metal such as a spring steel clip element.

The apparatus may be mounted in a pickup truck as follows: first the factory installed cable system is removed from one side of the truck side panel and the tailgate by removing the screws attaching the cables to the panel and tailgate. The short shank bearing the trigger component may be connected to the truck side panel with the original screw, and the long shank bearing the sprocket may be connected to the tailgate with the original screw. In both cases, preferably a spacer washer is placed between the shank and the truck panel or tailgate, then the shank, followed by a shoulder washer and finally the screw. The same thing is then done with the truck side panel and the tailgate on the other side of the car. A person of ordinary skill will recognize that the adjustor apparatus on each side of the tailgate are mirror images of each other. In presently preferred embodiments the maximum weight to be placed on the tailgate when the apparatus of the invention is mounted and engaged is about 200 pounds, or about 250 pounds or about 300 pounds or more.

The adjustor apparatus of the present invention thus permits the tailgate to, for example, be locked in an open position in which the tailgate is at a greater than 90° angle with respect to the fully closed position. This position conveniently permits the loading and unloading of items such as wheeled vehicles into the cargo bed.

The adjustor apparatus may also be used to lock the tailgate in a slightly open position (for example, approximately 20 to 30 degrees) to act as a spoiler and to direct airflow over the rear of the truck more efficiently while the truck is in motion; this can result in reduced gasoline, diesel and/or electricity usage, thereby increasing mileage and fuel efficiency.

The adjustors of the present invention may be adapted for use in adjusting the hatchback of a car or the window of a camper shell (both of which, unlike the tailgate, open in an "up" position) so as to lock the window or hatch in a stable, partially closed position when an oversized load is placed in the cargo area, thereby securing the load within the cargo area.

When made of a metal or alloy, preferably the shanks of the apparatus are electrocoated, galvanized, or otherwise covered with an anticorrosion material. Such a material may, without limitation, be a zinc-containing material, a nickel-containing material, a polymeric material, and mixture of such materials. Exemplary anti-corrosion materials are well known to those of skill in the art.

In some uses, the support apparatus of the present invention may be used in conjunction with one or preferably two reinforcing sheaths, which may be installed on each lateral end of a truck tailgate. Modern truck and SUV tailgates are made using relatively thin metal sheeting, which can lack sufficient strength or rigidity to support heavier objects (such as motorcycles loaded using the tailgate, held at a desired angle by the support apparatus, as a ramp) without the tailgate bending or becoming distorted.

The sheaths may be made from similar material as the support apparatus, such as stainless steel (e.g., 440C and/or 304 stainless steel) or a similar hard metal, or a polymer or carbon fiber material. The sheathes are generally shaped and sized to fit the lateral end profiles of the tailgate, and are preferably bout 3 to about 9 inches wide, surrounding the top and bottom sides of the tailgate and preferably covering the ends thereof as well. If the reinforcing sheaths include end coverings, the ends may have a hole, for example a tapped hole, for rotatable connection of the support apparatus to the tailgate, as described above.

Although the foregoing invention has been exemplified and otherwise described in detail for purposes of clarity of understanding, it will be clear that modifications, substitutions, and rearrangements to the explicit descriptions may be practiced within the scope of the appended claims. To the extent that a plurality of inventions are disclosed herein, any such invention shall be understood to have disclosed herein alone, in combination with other features or inventions disclosed herein, or lacking any feature or features not explicitly disclosed as essential for that invention. For example, the inventions described in this specification can be practiced within elements of, or in combination with, other any features, elements, methods or structures described herein. Additionally, features illustrated herein as being present in a particular example are intended, in other aspects of the present invention, to be explicitly lacking from the invention, or combinable with features described elsewhere in this patent application, in a manner not otherwise illustrated in this patent application or present in that particular example. Solely the language of the claims shall define the invention. All publications, patents and patent documents cited herein are each hereby incorporated by reference in its entirety for all purposes to the same extent as if each were so individually denoted.

DETAILED DESCRIPTION OF THE INVENTION

The present invention is directed to methods and compositions for adjustably maintaining a structure at least partially rotatable about a hinge. Preferably the structure to be maintained in a given position has a substantially flat, planar shape, such as a door, a window or a truck tailgate. As used in the present application, a shape that is "substantially flat and/or planar" is not limited to a two dimensional surface, but may include three dimensional shapes as well. For example, a cuboid shape having a relatively thin depth (such as a window or door) is within this definition, as is the shape of a truck tailgate, which may have a curve in an interior or exterior surface thereof, but nevertheless has the general essential shape and interchangeable function of a flat gate.

Figure 1A:
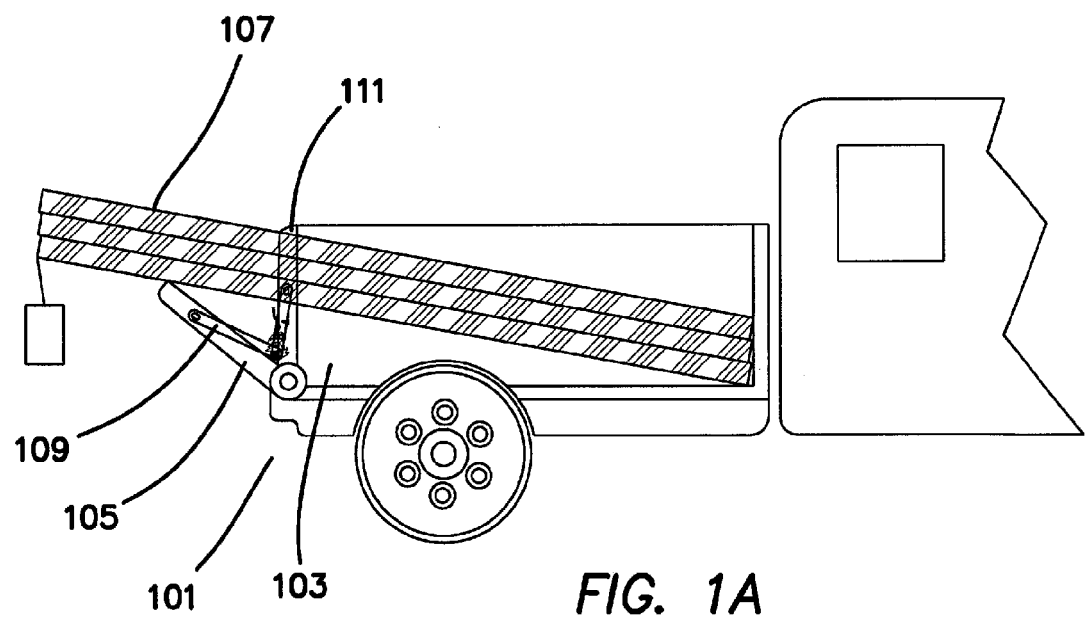
FIG. 1A is a side view of the tailgate adjuster of the present invention installed on a truck having an oversized flat payload.

Thus, FIG. 1A is a side view of a pickup truck 101 having a cargo bed 103. The cargo bed in this figure contains a flat payload 107. As shown in the figure, the payload 107 is longer than the length of the cargo bed 103; such a payload may comprise, for example, planks of lumber or sheets of drywall. Such loads of substantially flat, substantially planar payloads are notoriously difficult to secure for transit, since they generally do not have any easily securable "hold down" features, such as holes, hooks, or protrusions, to which a rope or length of line can be conveniently made fast. If the truck tailgate 105 is left open, the payload can easily slide out of the truck bed, for example, during turns or acceleration of the vehicle. Contrarily, if the tailgate is maintained in a completely raised position the driver's rear view visibility may be compromised.

As shown, this problem is solved by the present invention wherein one end of an adjustably locking rotatable bracket (tailgate adjuster) 109 is rotatably connected to an outside surface of one side of the tailgate, and the other end of adjustably locking rotatable bracket 109 is rotatably connected to a vehicle panel 111 located proximal and opposing the same side of the tailgate, and the tailgate is raised to about 45° from the horizontal. Preferably, the tailgate is equipped with adjustably locking rotatable brackets 109 on each side of the tailgate, with each such bracket rotatably connected to the vehicle panel 111 located proximal and opposing the side of the tailgate to which the other end of the bracket is connected. The use of two adjustably locking rotatable brackets 109 aids in firmly and securely retaining the tailgate locked at the desired angle, and increases the possible mass of the load that can be placed on the tailgate during use.

Figure 1B:
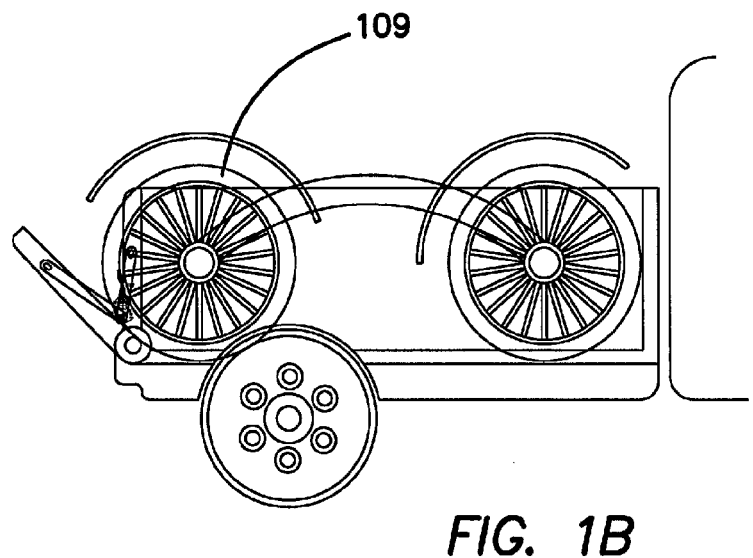
FIG. 1B is a side view of the tailgate adjuster of the present invention installed on a truck having a motorcycle as payload.

FIG. 1B is a side view of a pickup truck 101 having a cargo bed 103, wherein the figure is identical to FIG. 1A except the payload comprises a motorcycle 109. Those of ordinary skill will immediately envision other possible payloads, for example other oversized payloads, for which the present invention will prove useful.

Figure 2:
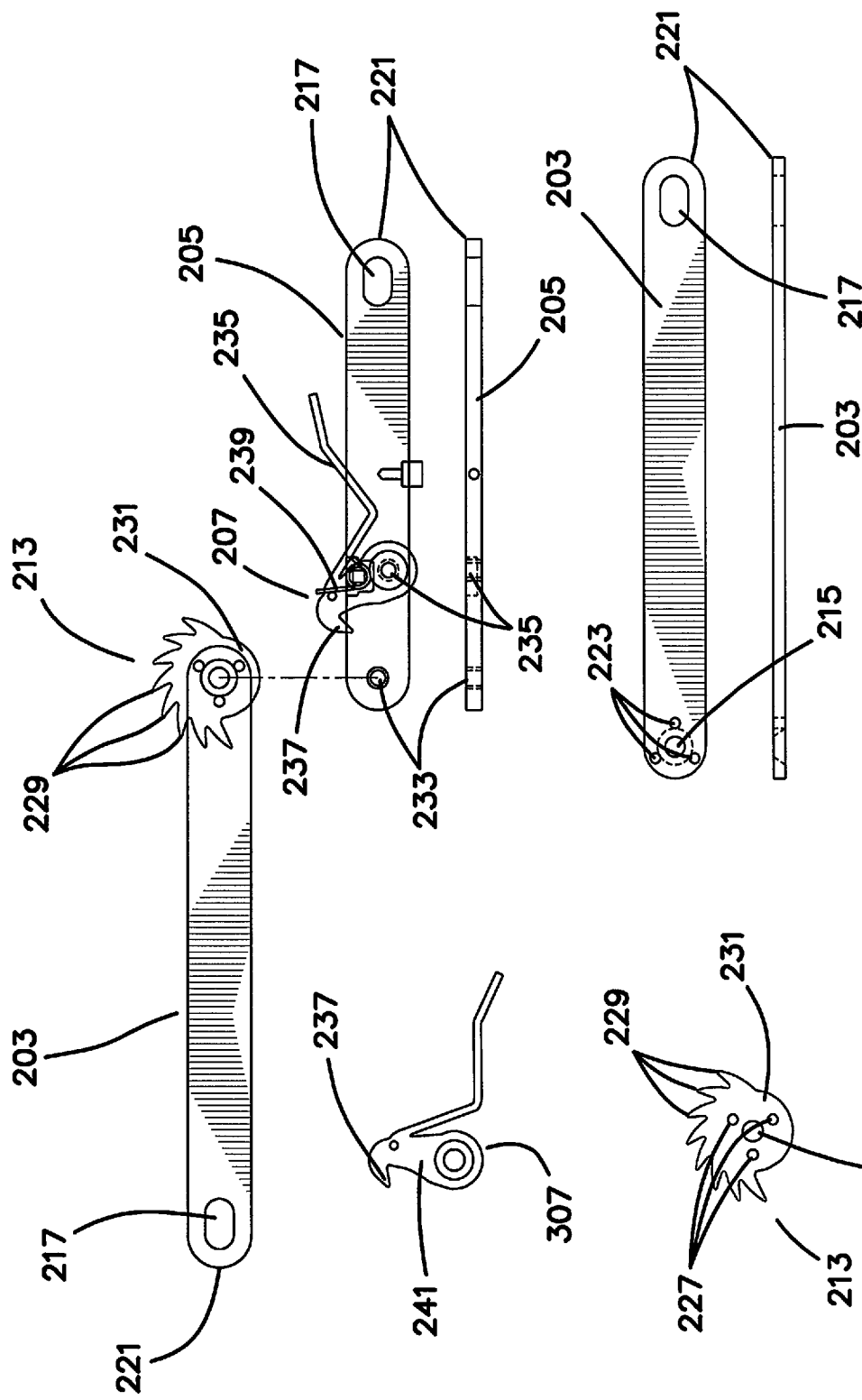
FIG. 2 is an exploded view showing the components of an adjustably locking rotatable bracket (tailgate adjustor) of the present invention.

Turning now to FIG. 2, there is shown an exploded side view of an example of the adjustably locking rotatable bracket of the present invention. The adjustably locking rotatable bracket apparatus as shown comprises two rigid shanks, a longer shank 203 and a shorter shank 205. The shanks are preferably approximately cuboid—as shown in FIG. 2 the ends of the shanks 221 are rounded, but the top and bottom surfaces and the side surfaces are flat and parallel, and such shapes are within the definition of "approximately cuboid" as used herein. The shanks may be comprised of, without limitation, a metal, a metal alloy, a carbon fiber composition, or a strong, durable polymer. In preferred example, the shanks are made of stainless steel, but may be made of any suitable metal, such as a hardened bronze or a titanium alloy. Each of the shanks comprise a hole, preferably an elongated circular or stadium shaped hole 217, proximate to one end thereof.

The longer shank 203 comprises a sprocket 213 fitted proximate to the end of the shank that does not contain hole 217. The sprocket may be affixed to the longer shank by any suitable means, such as by welding, cementing, gluing, bolting, or riveting. As shown in FIG. 2, the longer shank comprises a circular larger diameter hole 215 and three small pins 223 arranged in an equidistant arrangement from each other, with each small pin also equidistant from hole 215, thereby defining an equilateral triangle around hole 215.

The sprocket 213 likewise comprises a hole 225, preferably of the same diameter as that of the longer shank, as well as small holes 227 slightly larger than the smaller holes 223 of the longer shank. Hole 225 and smaller holes 227 of the sprocket are arranged to exactly overlay those of the longer shank, such that bolts, screws, and or rivets may be used to join the sprocket 213 to the longer shank 203. In some examples, holes 215 and 225 may be tapped to permit machine screws to connect the longer shank 203, the sprocket 231, and the shorter shank 205. Those of ordinary skill in the art will be aware that this is simply one description of how the sprocket may be fastened to and supported on the shank, and other methods, and variations of these methods, will be easily apparent based upon this disclosure and may be used instead.

The sprocket 213 comprises a plurality of teeth 229 arranged biased and oriented towards the opposing end (in this case, the end having the elongated circular or stadium shaped hole 217) of the shank on which the sprocket is mounted. Preferably, although not necessarily to the functioning of the invention, the sprocket teeth 229 are arranged and oriented substantially around one side or "hemisphere" of the body of the sprocket, while the remainder of the circumference of the sprocket 231 remains rounded, i.e., without teeth. It will be understood that in other examples, the sprocket teeth may extend further or even entirely around the sprocket body. The sprocket is affixed to the longer shank 203 in an orientation that places the teeth of the sprocket along one edge of the shank. In other example of the invention the sprocket may comprise curved plates on each side of the sprocket teeth to prevent the sprocket-engaging trigger tooth 237 from becoming disengaged or slipping from the sprocket teeth during use.

The shorter shank 205 comprises hole 233 having the same or similar diameter as hole 215. Additionally, shank 205 comprises hole 235, located in this example, about 5/8 inches along the length of the shank from hole 233; holes 233 and 235 may have the same or similar diameter as holes 215 and 225, or may have different diameters, In preferred examples the shanks 203 and 205, and/or the trigger component 207 and shank 205, may be joined using rivets.

Trigger component 207 comprises handle 235, the main body 241 of the trigger, comprising sprocket-engaging tooth 237, and spring component 239. In some examples, the majority of the trigger may, for example, be cut out from one sheet of metal, except for the spring component 239; in other examples the handle 235 may be welded, bolted or otherwise affixed to the main body of the trigger. The trigger component 207 is rotatably joined to the shorter shank 205, for example, by means of a rivet or machine screw of suitable length, size and diameter to fit hole 233. The spring component may be of any suitable design to bias the trigger to apply torque to the trigger towards an "engaged" position (i.e., in the direction of the sprocket engaging tooth; counter-clockwise in FIG. 2).

In one preferred example, the spring component 239 comprises a length of spring wire or a narrow ribbon of bent spring steel affixed and anchored at one end thereof to the shorter shank 205 by way of, without limitation a shallow protrusion and or a hole or slit located on the shorter shank, proximal to the hole 233. The other end of the spring component is affixed to, or made to engage with a protrusion, shelf, hole or slit on the trigger component in a manner that applies torque to the trigger towards an "engaged" position.

Figure 3A:
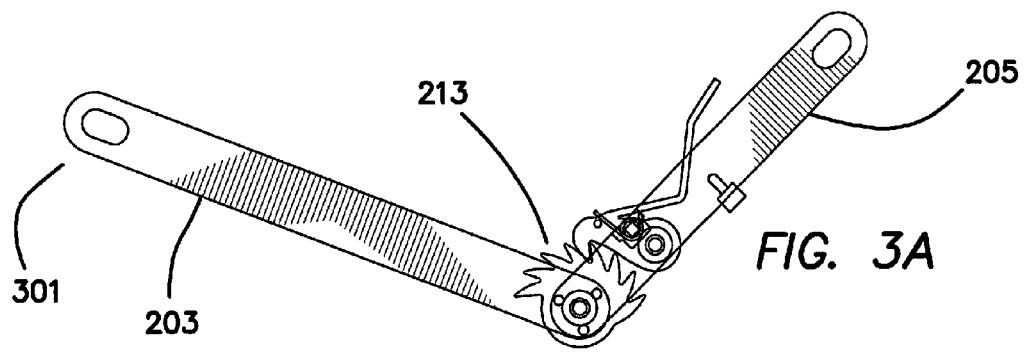
FIG. 3A is a side view of an assembled example of the adjustably locking rotatable bracket shown in FIG. 2, in a locked, angled position.

FIG. 3A is a side view of an assembled example of the adjustably locking rotatable bracket shown in FIG. 2 wherein the longer shank 203 has been joined to the shorter shank 205 with sprocket 213 placed in between, using a rivet through holes 215, 235 and 225 (see FIG. 2), respectively, to grip and join shanks 203 and 205, and sprocket 213. The sprocket 213 is non-rotatably joined to longer shank 203, for example, by welding. The rivet permits the longer shank and the shorter shank to articulate with respect to each other about the axis of the machine screw projecting through and aligning holes 215, 235 and 225. In other examples, the rivet may be replaced by, for example, a machine screw.

In the view shown in FIG. 3A the adjustably locking rotatable bracket 301 is shown in a locked position with the angle between the two shanks 203 and 205 being about 115°. The trigger component 207 is held in the counterclockwise direction by torque forces generated by spring component 239 so that sprocket-engaging tooth 237 fits between selected sprocket teeth 229. The engagement of the trigger sprocket-engaging tooth with the teeth of the sprocket effectively prevents further articulation of shanks 203 and 205 with respect to each other to increase the angle between them, thereby locking the articulated joint in one direction. However, due to the shape of the sprocket teeth and the trigger tooth, this angle can still be readily reduced (and the reach of the bracket shortened) when the trigger is engaged by articulating the joint in the other direction; that is by moving the shorter shank 205 in a counter clockwise direction (or the longer shank 203 in a clockwise direction).

Those of skill in the art will quickly recognize that in some cases it may be useful for the adjustably locking rotatable bracket to be structured to be capable of locking in both directions. This can be accomplished by various methods, such as (without limitation) by making the teeth of the sprocket and the sprocket-engaging tooth of the trigger substantially triangular and extending generally radially outward from the sprocket rather than in the counterclockwise-biased arrangement shown in FIGS. 2, and 3A-3C.

Figure 3B:
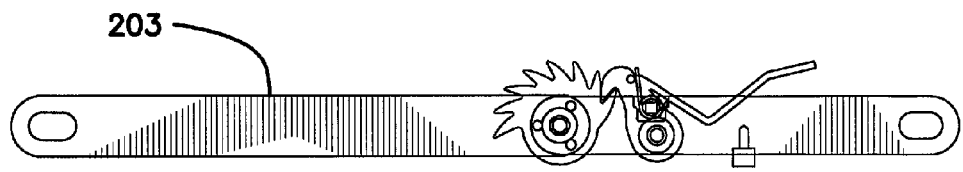
FIG. 3B is a side view of the adjustably locking rotatable bracket locked in a fully extended position.

FIG. 3B shows the adjustably locking rotatable bracket 301 locked in a fully extended position, in which the angle about the machine screw joining holes 215, 235 and 225 and rotatably linking the shorter shank 205 and the longer shank 203 is about 180°.

Figure 3C:
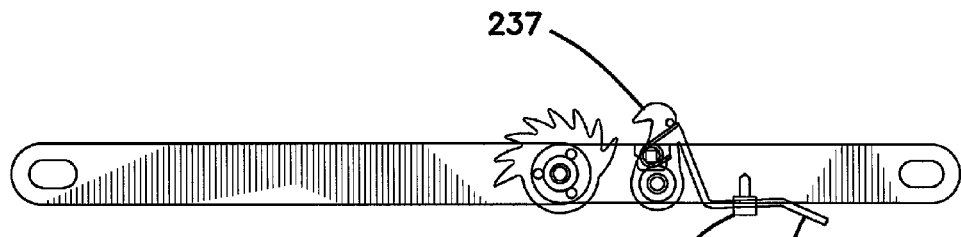
FIG. 3C is a side view of the adjustably locking rotatable bracket in a fully extended position with the trigger component unengaged.

FIG. 3C shows the adjustably locking rotatable bracket 301 in a fully extended position (in which the angle about the rivet joining holes 215, 235 and 225 and rotatably linking the shorter shank 205 and the longer shank 203 is about 180°), but wherein the trigger component 213 is not engaged, and the bracket is thus in an "unlocked" position. As can be seen, the handle 235 of the trigger component 207 has been pulled down and inserted into trigger clip 331, thus raising the sprocket-engaging trigger tooth 237 away from the sprocket, and permitting the longer shank and shorter shank to freely rotate with respect to each other (thus initially shortening the bracket as a whole).

Also shown in FIG. 3C is trigger clip 331, which is affixed to the shorter shank 205. The trigger clip may be screwed, cemented, glued, or otherwise fastened to a base or side of the shank. As shown, the trigger clip is screwed to the underside of the shank. The trigger clip contains or consists of a flexible material, which may comprise, for example, a plastic such as polyvinyl chloride ("PVC"), a natural or synthetic rubber, or another elastomeric material. A narrow horizontal channel (not shown) extends along an outside side of the clip; the channel is preferably slightly narrower than the width of trigger handle 235 such that, when the trigger handle is inserted into the channel, it is retained there against, and to counter, the force of compressed spring component 239. In some examples, the channel, or trigger clip as a whole, may comprise a flexible metal clip such as one made of spring steel.

Figure 3D:
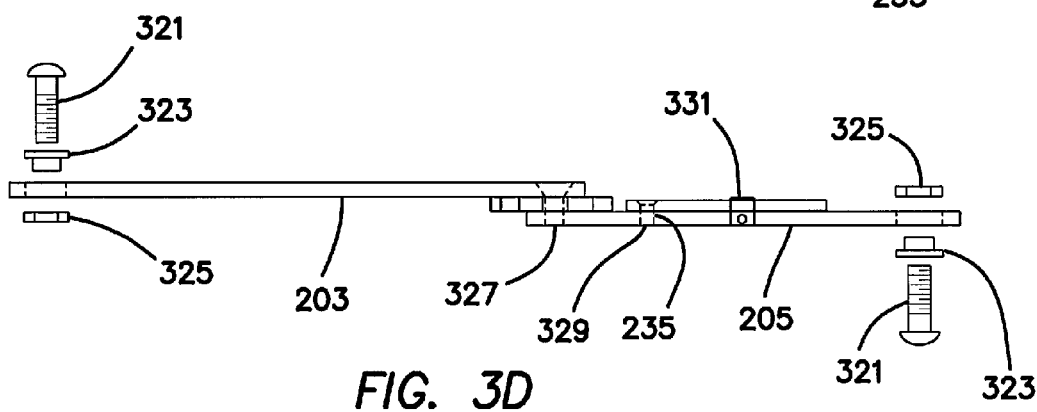
FIG. 3D is a partial cutaway top view of the adjustably locking rotatable bracket in a fully extended position with the trigger component unengaged.

FIG. 3D is a partial cutaway top view of the adjustably locking rotatable bracket 301 in a fully extended position, as also shown in side view in FIG. 3C. As shown the longer shank 203 is connected by a rivet 327 through holes 215, 235 and 225 (see FIG. 2) to shorter shank 205, with sprocket 213 affixed in between. A shorter rivet 329 connects trigger component to the shorter shank 205. Screws 321 are inserted through shoulder washer 323, then through hole 217 and spacer washer 325 before being inserted in a tapped hole in either the side of the tailgate (preferably, longer shank), or a side panel of the truck or truck cargo bed (preferably, shorter shank). Usually, the preexisting standard issue flexible wire cables are fastened by screws and tapped holes to the same locations of the tailgate and cargo bed, and the same tapped holes can be reused to connect the adjustably locking rotatable bracket 301 of the present invention to the vehicle truck and tailgate, although if necessary, suitable holes can be drilled and tapped de novo. As will be apparent to a person of ordinary skill in the art, it is very preferable that an adjustably locking rotatable bracket of the present invention be connected to each side of the tailgate to provide stability and structural strength to the tailgate when locked in a position intermediate between fully open and fully closed.

Figure 4:
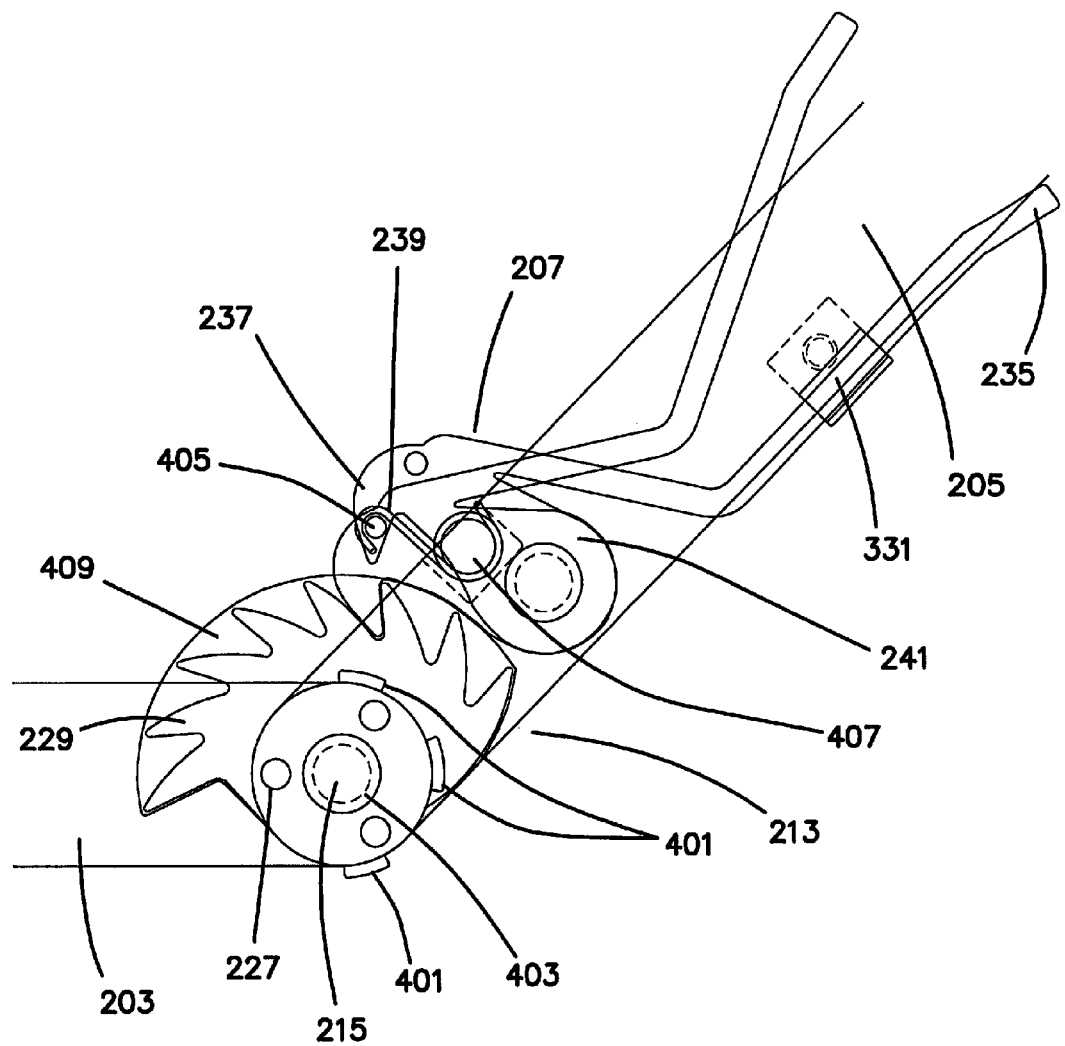
FIG. 4 is a close-up of the rotatable joint between shanks of an example of the support apparatus of the present invention.

FIG. 4 shows another example of the support apparatus of the present invention, and comprises a close-up of the sprocket 213 and trigger component assembly 207. In this example, longer shank 203 is joined to sprocket 213 by welding at three locations 401. Rivet 403 rotatably joins the longer shank 203 with sprocket 213 attached and the shorter shank 205 through hole 215 (and holes 225 and 233; not shown). Pins 227 secure the sprocket 213 to the longer shank 203 to prevent torque displacement of the sprocket during use.

Trigger component 207 is shown in both engaged and disengaged configurations. When the trigger component is in the disengaged position, the handle 235 is inserted into clip 331. As described above, the trigger component is biased in an engaged position by torsion spring 239, which is anchored to the trigger component by protrusion 405 and protrusion 407 (in this example, the spring is bent around the protrusions.) In this example, sprocket component 213 comprises two curved sheets of metal (409; only one curved sheet is shown in this side view) formed on each side of the sprocket teeth 229. The trigger component is rotatably joined to the shorter shank 205 by a rivet 411 through hole 235.

Figure 5A:
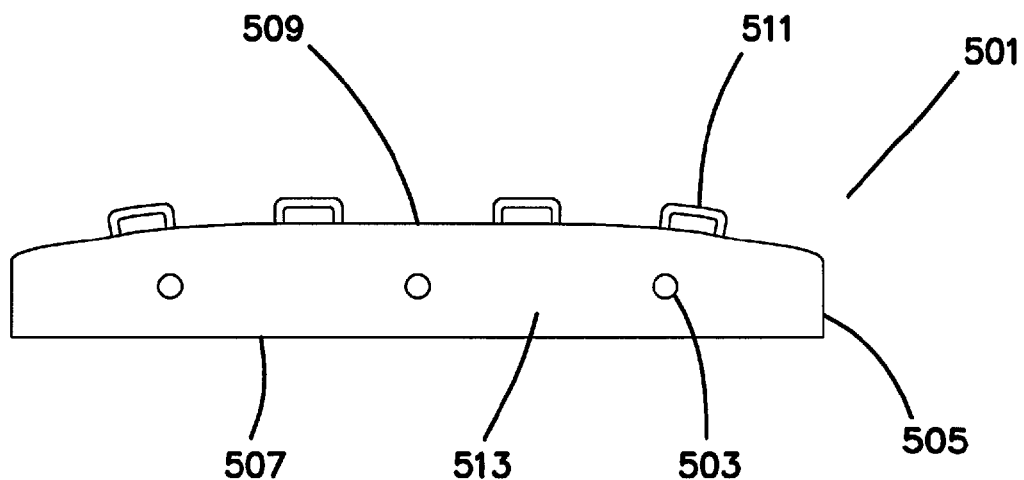
FIG. 5A is a top view of a tailgate reinforcing sheath of the present invention.

FIG. 5A is a top view of another example of the present invention comprising a tailgate-reinforcing sheath 501. The sheath is very preferably made from a strong metal or metal alloy such as steel, and is effective to prevent bending of the tailgate when the support apparatus of the invention is employed in concert with a large load, such as a one or more motorcycle or all terrain vehicle (ATV). As shown in this figure, the sheath has a rear surface 509, side surfaces 505, front surface 507, and top surface 513. Optional U-shaped brackets 511 may be welded to top surface 509; these are also preferably made of a strong metal or metal alloy.

The tailgate-reinforcing sheath also has a plurality of holes on facing surface 513 for fastening to the underlying tailgate surface near the end of the tailgate, preferably using blind rivets.

Figure 5B:
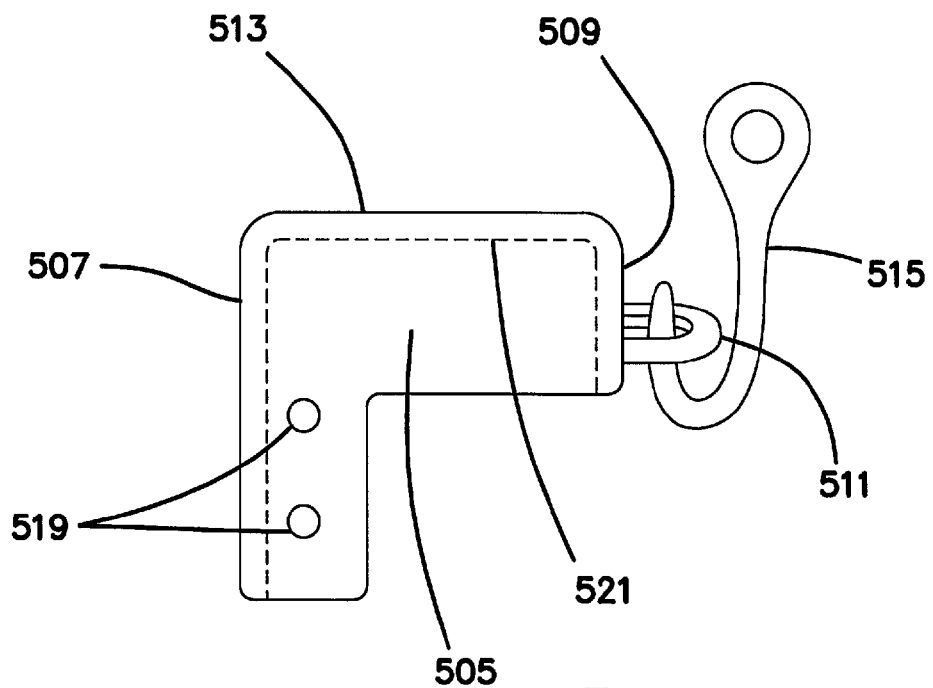
FIG. 5B shows a[[q]] side view of the tailgate reinforcing sheath shown in FIG. 5A.

FIG. 5B shows a side view of the same exemplary tailgate-reinforcing sheath. Thus, Surfaces 513, 509 and 507 are shown, as is optional U-shaped bracket 511 with a removable hook 515. Dotted line 521 shows the underlying end portion of the vehicle tailgate. Holes 519 are available on side surface 505 for the insertion of screws to join the sheath to the side of the tailgate. As can be seen in this figure, the tailgate-reinforcing sheath comprises a hollow void within shaped to receive and closely fit and cover the end portion of the tailgate 521.

The various descriptions of the invention provided herein illustrate presently preferred examples of the invention; however, it will be understood that the invention is not limited to the examples provided, or to the specific configurations, shapes, and relation of elements unless the claims specifically indicate otherwise. Based upon the present disclosure a person of ordinary skill in the art will immediately conceive of other alternatives to the specific examples given, such that the present disclosure will be understood to provide a full written description of each of such alternatives as if each had been specifically described.

The invention claimed is:

1. An apparatus comprising:
 an adjustably locking rotatable bracket having
  a) a first shank comprising a first apparatus end having a hole structured to accommodate a screw or bolt, and a first connection end opposing the first apparatus end;
  b) a second shank comprising a second apparatus end defining an opening structured to accommodate a screw or bolt, and a second connection end opposing the second apparatus end, said first shank being rotatably joined to the second shank at a connection point joining said first connection end and said second connection end;
  c) a sprocket component joined to said second shank at a location proximal to said connection point, said sprocket component comprising a plurality of sprocket teeth;
  d) a trigger component rotatably joined to the first shank at a position sufficiently proximal to said connection point to engage said sprocket component, said trigger component comprising a trigger tooth structured to engage a sprocket tooth when rotated from an unengaged position to an engaged position and a handle effective to rotate said trigger component from an unengaged position to an engaged position, wherein said trigger component is effective when so engaged to prevent rotation of the connection between the first shank and the second shank in at least one direction.

2. The apparatus of claim 1 wherein said sprocket component is joined to the second shank at said connection point.

3. The apparatus of claim 1 wherein said trigger component comprises a spring structured to exert a force biasing the trigger component in the engaged position.

4. The apparatus of claim 3 wherein said first shank comprises a clip joined thereto and effective to hold the arm component of the trigger component in an unengaged position when the arm component is placed therein.

5. The apparatus of claim 1 wherein said sprocket comprises at least 6 teeth.

6. The apparatus of claim 1 wherein the sprocket teeth are spaced apart so as to orient the rotatably connected shanks, when said trigger component is engaged with said sprocket component, in increments of at least about 22 degrees with respect to each other.

7. An apparatus comprising:
 a) a first shank comprising a first apparatus end defining an opening adapted to accommodate a screw or bolt, and a first connection end opposing the first apparatus end;
 b) a second shank comprising a second apparatus end defining an opening adapted to accommodate a screw or bolt, and a second connection end opposing the second apparatus end, wherein said first shank is rotatably joined to the second shank at a connection point;
 c) a sprocket component joined to said second shank at a location proximal to said connection point, said sprocket component comprising a plurality of teeth;
 d) a trigger component rotatably joined to the first shank at a position proximal to said connection point, said trigger component comprising a trigger tooth structured to engage a sprocket tooth when rotated from an unengaged position to an engaged position and an arm component effective to rotate said trigger component from an open position to a closed position, wherein said trigger component is effective when so engaged to prevent rotation of the connection between the first shank and the second shank in at least one direction;
 wherein, when said first apparatus end is rotatable joined to a vehicle body at a location proximal to a rear hinged opening of said vehicle, said second apparatus end is joined to said rear hinged opening of said vehicle, and said trigger tooth engages a sprocket tooth of said second shank, said rear hinged opening is prevented from rotating around the hinge axis in at least one direction.

8. The apparatus of claim 7 wherein said sprocket component is joined to the second shank at said connection point.

9. The apparatus of claim 7, wherein said trigger component comprises a spring biasing the trigger component in the closed position.

10. The apparatus of claim 9 wherein said first shank comprises a clip joined thereto and effective to hold the arm component of the trigger component in an open position when the arm component is placed therein.

11. The apparatus of claim 10 wherein said sprocket comprises at least 6 teeth.

12. The apparatus of claim 11 wherein the sprocket teeth are spaced apart so as to orient the rotatably connected shanks, when said trigger component is engaged with said sprocket component, in increments of at least about 22 degrees with respect to each other.

* * * * *